US008090254B2

United States Patent
Wang (10) Patent No.: US 8,090,254 B2
(45) Date of Patent: Jan. 3, 2012

(54) SYSTEM AND METHOD FOR CONTROLLING SHUTTER OF IMAGE PICKUP DEVICE BASED ON RECOGNIZABLE CHARACTERISTIC IMAGE

(75) Inventor: Huai-Cheng Wang, Jhongli (TW)

(73) Assignee: Getac Technology Corporation, Hsinchu (TW)

( * ) Notice: Subject to any disclaimer, the term of this patent is extended or adjusted under 35 U.S.C. 154(b) by 519 days.

(21) Appl. No.: 12/213,609

(22) Filed: Jun. 23, 2008

(65) Prior Publication Data
US 2009/0162047 A1   Jun. 25, 2009

(30) Foreign Application Priority Data
Dec. 19, 2007 (CN) .......................... 2007 1 0300546

(51) Int. Cl.
*G03B 17/00* (2006.01)
(52) U.S. Cl. .......................... 396/263; 382/118; 382/190
(58) Field of Classification Search .................. 396/246, 396/247
See application file for complete search history.

(56) References Cited

U.S. PATENT DOCUMENTS

| | | | | |
|---|---|---|---|---|
| 6,215,890 B1 * | 4/2001 | Matsuo et al. | ................ | 382/103 |
| 7,440,022 B2 * | 10/2008 | Matsumoto | .................... | 348/364 |
| 7,483,057 B2 * | 1/2009 | Grosvenor et al. | ........ | 348/211.9 |
| 7,920,785 B2 * | 4/2011 | Kretz et al. | .................... | 396/263 |
| 2004/0235531 A1 * | 11/2004 | Anzawa et al. | ................ | 455/563 |
| 2005/0063566 A1 | 3/2005 | van Beek et al. | | |
| 2006/0092292 A1 * | 5/2006 | Matsuoka et al. | ........ | 348/231.99 |
| 2006/0115157 A1 * | 6/2006 | Mori et al. | ..................... | 382/190 |
| 2007/0025722 A1 * | 2/2007 | Matsugu et al. | .............. | 396/263 |
| 2007/0140532 A1 * | 6/2007 | Goffin | .......................... | 382/118 |
| 2007/0263935 A1 * | 11/2007 | Sanno et al. | ................... | 382/190 |
| 2008/0231721 A1 * | 9/2008 | Chou et al. | ................. | 348/222.1 |
| 2009/0002512 A1 * | 1/2009 | Suzuki et al. | ............... | 348/222.1 |
| 2009/0060295 A1 * | 3/2009 | Inoue et al. | .................... | 382/118 |
| 2009/0080715 A1 | 3/2009 | van Beek et al. | | |
| 2009/0154795 A1 * | 6/2009 | Tan et al. | ...................... | 382/155 |
| 2009/0158220 A1 * | 6/2009 | Zalewski et al. | .............. | 715/863 |
| 2010/0135584 A1 * | 6/2010 | Tang et al. | .................... | 382/218 |

FOREIGN PATENT DOCUMENTS

CN   1568489   1/2005

OTHER PUBLICATIONS

Communication from the Chinese Patent Office dated Nov. 27, 2009.

* cited by examiner

Primary Examiner — W. B. Perkey
Assistant Examiner — Linda B Smith (57) ABSTRACT

An image pickup device uses an image recognition system to control the actuation of an electronic shutter. The image pickup device has an optical lens that picks up an image through the electronic shutter and the image so picked up is detected by an image detection device and converted into image data that are applied to a temporary image holding memory of a micro-controller. The micro-controller carries out comparison of the image of a selected target that is picked up the optical lens with respect to a recognizable characteristic image contained in a recognizable characteristic image database. If the image of the selected target so picked up is recognized to match the recognizable characteristic image, then the micro-controller sends out a shutter control signal to control the actuation of the electronic shutter via a shutter control circuit to photograph and store the image of the target in an image storage memory.

14 Claims, 6 Drawing Sheets

SYSTEM AND METHOD FOR CONTROLLING SHUTTER OF IMAGE PICKUP DEVICE BASED ON RECOGNIZABLE CHARACTERISTIC IMAGE

FIELD OF THE INVENTION

The present invention relates to controlling an electronic shutter of an image pickup device, and in particular to a method for controlling the operation of the electronic shutter of the image pickup device in a remote manner by means of recognizable characteristic image.

BACKGROUND OF THE INVENTION

A conventional image pickup device is operated in such a way that a viewfinder is first used to select a photographing target and then a shutter release is actuated to receive optical image of the target that is picked up by an optical lens through the electronic shutter to the image pickup device. With the progress of photographing control techniques, the operation of the image pickup device is improved from the traditional way of manually depressing a pushbutton, which is arranged on the image pickup device itself, to cable based control, such using a shutter cable, or wireless remote control, including for example using a remote controlling device and wearing a sensing glove for controlling the operation of the shutter. Apparently, various control techniques have been recently developed and available.

As discussed above, various operation/control techniques have been developed for operating/controlling an image pickup device. An example is disclosed in Taiwan Utility Model No. M268835, which illustrates a photographing mobile phone featuring remote control. In the known technique, the mobile phone has a phone body that features photographing function and the phone body forms a receiving space in which a wireless control device is accommodated in a manner that is detachable from the phone body. The wireless control device serves as a controller, which is secured in the receiving space of the phone body by means of a locking feature. The wireless control device can be removed out of the receiving space of the phone body for remote control of photographing operation. The remote control device comprises a power supply unit that supplies operation voltage to the operation of the remote control device.

SUMMARY OF THE INVENTION

The conventional techniques for controlling an image pickup device, including both cable based control and wireless remote control, such as remote controlling device or sensing glove, all require an additional controlling device, either wired or wireless.

In the known technique of the wireless-controlled photographing mobile phone that is just mentioned above, the wireless control device comprises a remote control that is powered by a power supply device that supplies the required operation voltage. In case that the power supply device of the remote control is short of power and is thus incapable to provide the desired operation voltage for normal operation of the remote control, the user's control and operation of the device is adversely influenced. As to wired control, such as a shutter cable, the range within which a use can operate the device is subject to limitation imposed by the length of the shutter cable.

Thus, an objective of the present invention is to provide a method for remotely controlling an electronic shutter that can be employed in an image pickup device, wherein an image recognition system is used to control the operation of the electronic shutter of the image pickup device.

Another objective of the present invention is to provide a method for remotely controlling an electronic shutter, which can be set in a customerized manner in accordance with the operation habits of the user to thereby provide a remote control method of an electronic shutter that features flexibility of operation.

In accordance with the present invention, a solution to the above problems resides in that an image recognition system is employed to control the actuation of an electronic shutter of an image pickup device in order to determine if to accept an image of a selected target that is picked up by an optical lens into the image pickup device.

The image recognition system first establishes a recognizable characteristic image database, which is composed of a basic recognizable characteristic image database and a customer-made recognizable characteristic image database. The basic recognizable characteristic image database contains at least one factory-made basic recognizable characteristic image, such as smiling face, a victory gesture or an OK gesture, so that a user can properly use and operate the actuation of the electronic shutter of the image pickup device by using the image recognition system without self-definition of the recognizable characteristic image.

The customer-made recognizable characteristic image database contains at least one customer-made recognizable characteristic image that is defined by the user. The customer-made recognizable characteristic image is established by the user who uses the image pickup device to directly pick up a recognizable characteristic image that is customerized by the user, including a recognizable characteristic image that is constrained in a specific zone, such as the location where the user sets a hand gesture, or a customerized recognizable characteristic image that is set in the full area of the image.

Using the customer-made recognizable characteristic image that is defined by the user himself or herself enhances the comparison between the recognizable characteristic image and the background to thereby increase the recognition of the customer-made recognizable characteristic image realized by the image recognition system. In restricted area image recognition, using fuzzy comparison of image recognition by comparison of similar target images with respect to the customer-made recognizable characteristic images allow the user to control the actuation of the electronic shutter in a convenient manner. In full image recognition, due to the fact that there are often more images present in the full image area, fuzzy comparison is not feasible for recognition of the customer-made recognizable characteristic image out of the target image and thus a target image that is of identical posture and orientation with respect to the customer-made recognizable characteristic image should be clearly defined.

Alternatively, the image recognition system may use a sequence of recognizable characteristic images, such as a get-ready gesture and a shutter-strike gesture and the target images are compared with the recognizable characteristic images in the given sequence to actuate the electronic shutter of the image pickup device whereby precise control of the image pickup device can be enhanced.

The solution proposed by the present invention allows an electronic shutter of an image pickup device to be actuated by being directly and remotely controlled by a recognizable characteristic image specified by a user, via an image recognition system that is operated on the basis of a recognizable characteristic image database, in order to accept the image of a selected target that is picked up by an optical lens into the image pickup device. In case of self-photographing, there will be no need to wait for counting down of the image pickup device, which often leads to unnatural tortuosity of facial expression, and no wired control device, such as a shutter cable, or wireless control device, such as remote control and sensing glove, is needed. The only thing needed for actuation of the electronic shutter is to set the specified smiling face or victory gesture that is specified by the user and is easily recognizable in order to remotely control the electronic shutter to take the image into the image pickup device.

The user-defined characteristic image can be a basic recognizable characteristic image that is contained in a factory-made basic recognizable characteristic image database, such a smiling face or a victory gesture, or can alternatively be a customer-made recognizable characteristic image that is stored in a customer-made recognizable characteristic image database and is formed by user directly photographing a target set in a desired gesture specified by the user. Thus, the user is allowed to simply change any characteristic image that he or she likes and the customerized electronic shutter control method provides the user with flexibility in controlling the actuation of the electronic shutter.

The image recognition system can also comprise sequentially arranged recognizable characteristic images for controlling the actuation of the electronic shutter, including a get-ready gesture and a shutter-strike gesture, whereby the electronic shutter can only be actuated by image recognition following the sequence of the recognizable characteristic images. In this way, the precision of control of the electronic shutter can be enhanced to eliminate undesired and incorrect actuation of the electronic shutter.

BRIEF DESCRIPTION OF THE DRAWINGS

The present invention will be apparent to those skilled in the art by reading the following description of a preferred embodiment thereof and the best mode for carrying out the present invention, with reference to the attached drawings, in which.

DETAILED DESCRIPTION OF THE PREFERRED EMBODIMENTS

Figure 1:
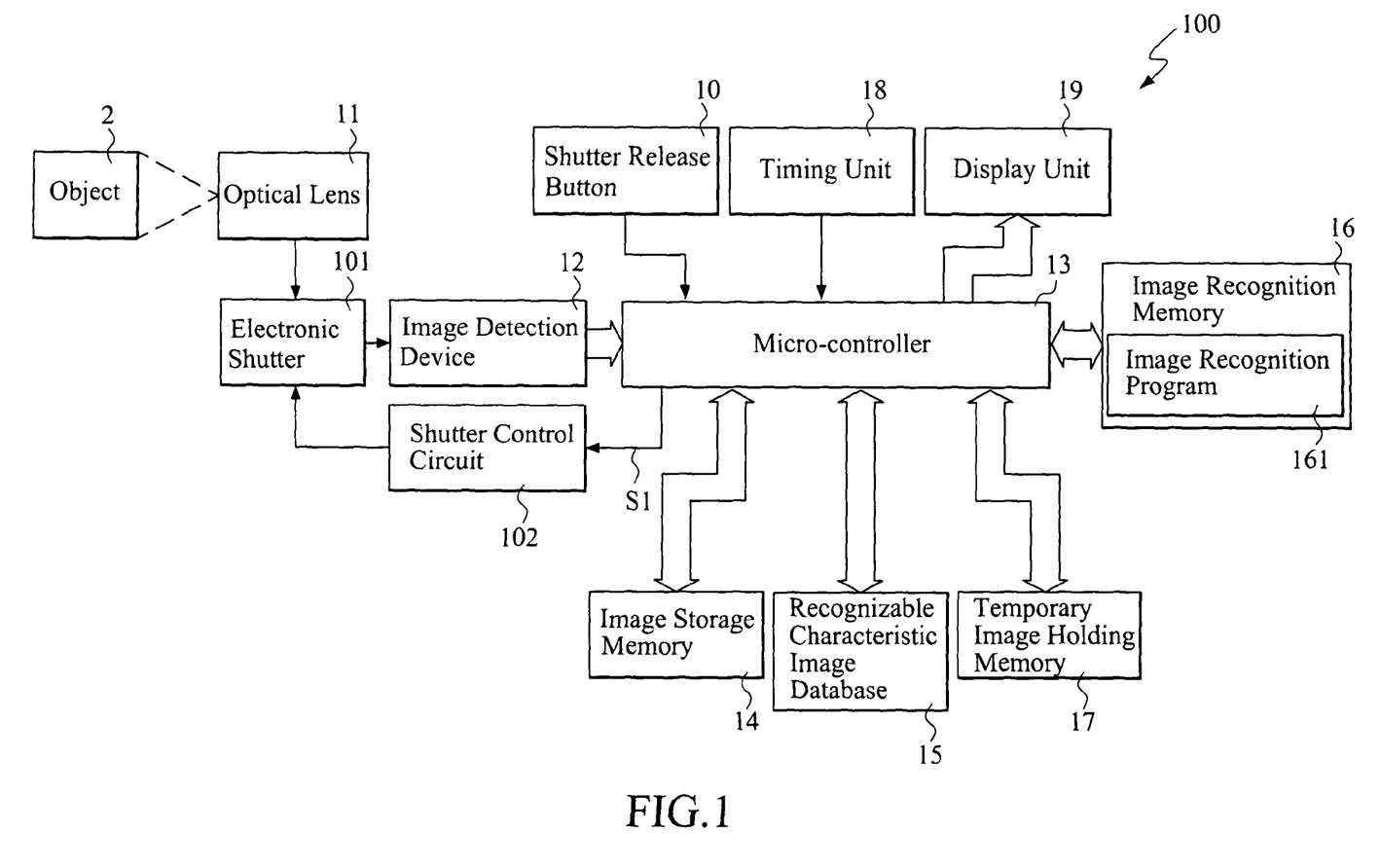
FIG. 1 schematically illustrates an image pickup device in accordance with the present invention that controls a shutter based on recognizable characteristic image.

With reference to the drawings and in particular to FIG. 1, which schematically illustrates an image pickup device 100 constructed in accordance with the present invention, which controls an electronic shutter, designated at 101, based on recognition of preset recognizable characteristic images, the image pickup device 100 is operable by aiming a viewfinder (not shown) at an object 2 to be photographed and then actuating a shutter release button 10 to activate the electronic shutter 101, which in the embodiment illustrated, is an electronic shutter, for receiving an image of the object 2 through an optical lens 11 into the image pickup device 100.

The electronic shutter 101 serves a control gate for the optical lens 11 to allow the image of the object 2 to be detected and picked up by an image detection device 12. The image detection device 12 can be any known image detection device, such as a charge-coupling device or the likes, which converts the image of the object 2 received by the optical lens 11 into digital image data, which are then transmitted to a microcontroller 13 connected to the image detection device 12.

The digital image data so obtained are then stored in memories of the microcontroller 13. The microcontroller 13 is connected to an image storage memory 14, a recognizable characteristic image database 15, an image recognition memory 16, and a temporary image holding memory 17. The image recognition memory 16 contains therein an image recognition program 161.

The microcontroller 13 is further connected to a timing unit 18 and a display unit 19. The timing unit 18 functions to supply a clock signal to the microcontroller 13 which generates a shutter control signal S1 at the time when the image pickup device 100 is set in a timed photographing mode. The shutter control signal S1 is transmitted to a shutter control circuit 102 that is connected to the microcontroller 13. The shutter control circuit 102 controls the operation of the electronic shutter 101 so that the electronic shutter 101 can be actuated at the time point that is set in the timing unit 18 to pick up the optical image that is received through the optical lens 11.

By means of the display unit 19 that is connected to the microcontroller 13, the digital image data that are supplied from the image detection device 12 to the microcontroller 13 can be displayed on the viewfinder.

Figure 2:
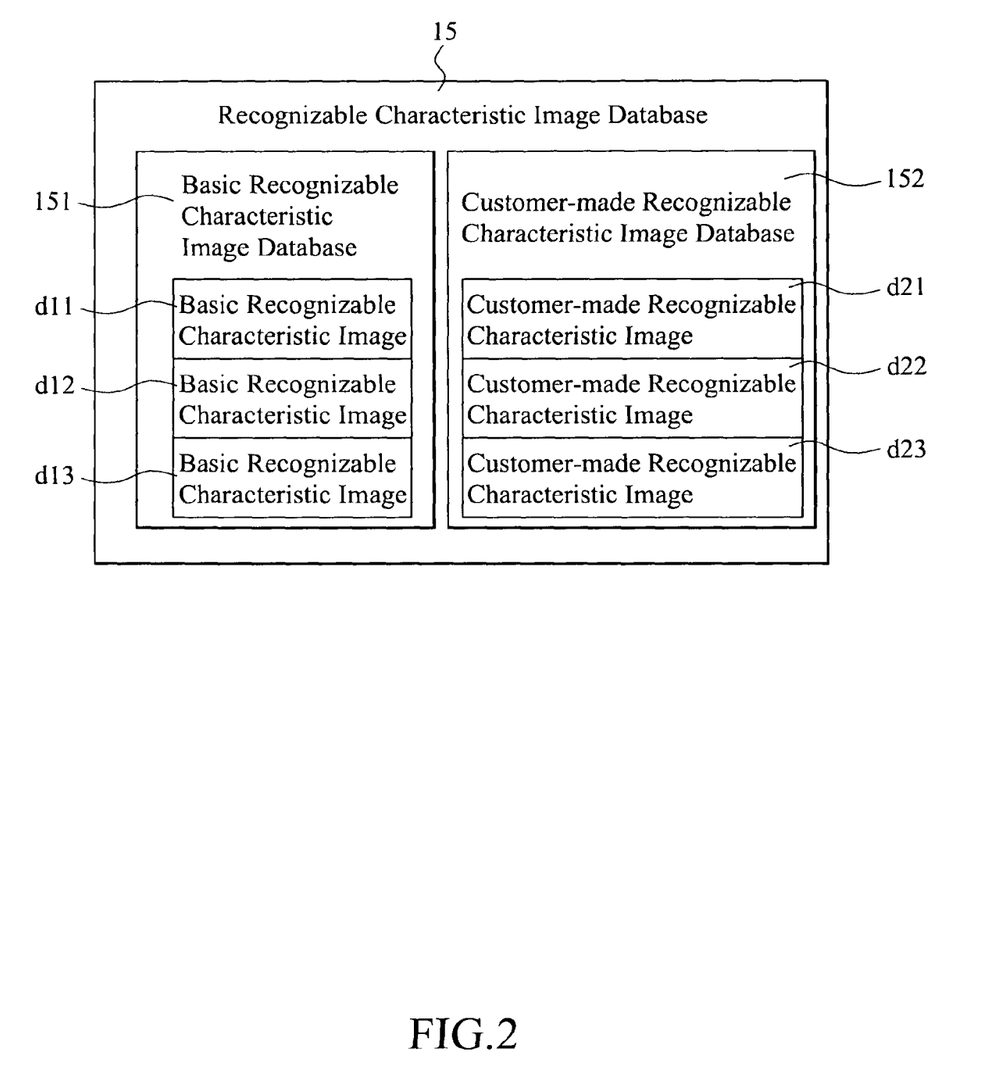
FIG. 2 illustrates the structure of a recognizable characteristic image database that is used in the image pickup device illustrated in FIG. 1.

FIG. 2 illustrates the structure of the recognizable characteristic image database 15 that is used in the embodiment illustrated in FIG. 1. The recognizable characteristic image database 15 is comprised of a basic recognizable characteristic image database 151 and a customer-made recognizable characteristic image database 152. The basic recognizable characteristic image database 151 contains at least one preset factory-defined basic recognizable characteristic image d11, d12, d13, while the customer-made recognizable characteristic image database 152 contains at least one customer-made recognizable characteristic image d21, d22, d23 that is defined by a user.

In the present invention, the image pickup device 100, when activated, loads in the image recognition program 161 from the image recognition memory 16. The microcontroller 13 temporarily holds the image of the object 2 picked up by the optical lens 11 in the temporary image holding memory 17.

The image of the object 2 that is temporarily held in the temporary image holding memory 17 is then compared with the recognizable characteristic image(s) contained in the recognizable characteristic image database 15. If in the image of the object 2, an image is identified to match the recognizable characteristic image(s), then the microcontroller 13 generates the shutter control signal S1, which is sent to the shutter control circuit 102 to control the actuation of the electronic shutter 101 in order to have the image of the object 2 picked up and stored in the image storage memory 14.

Figure 3:
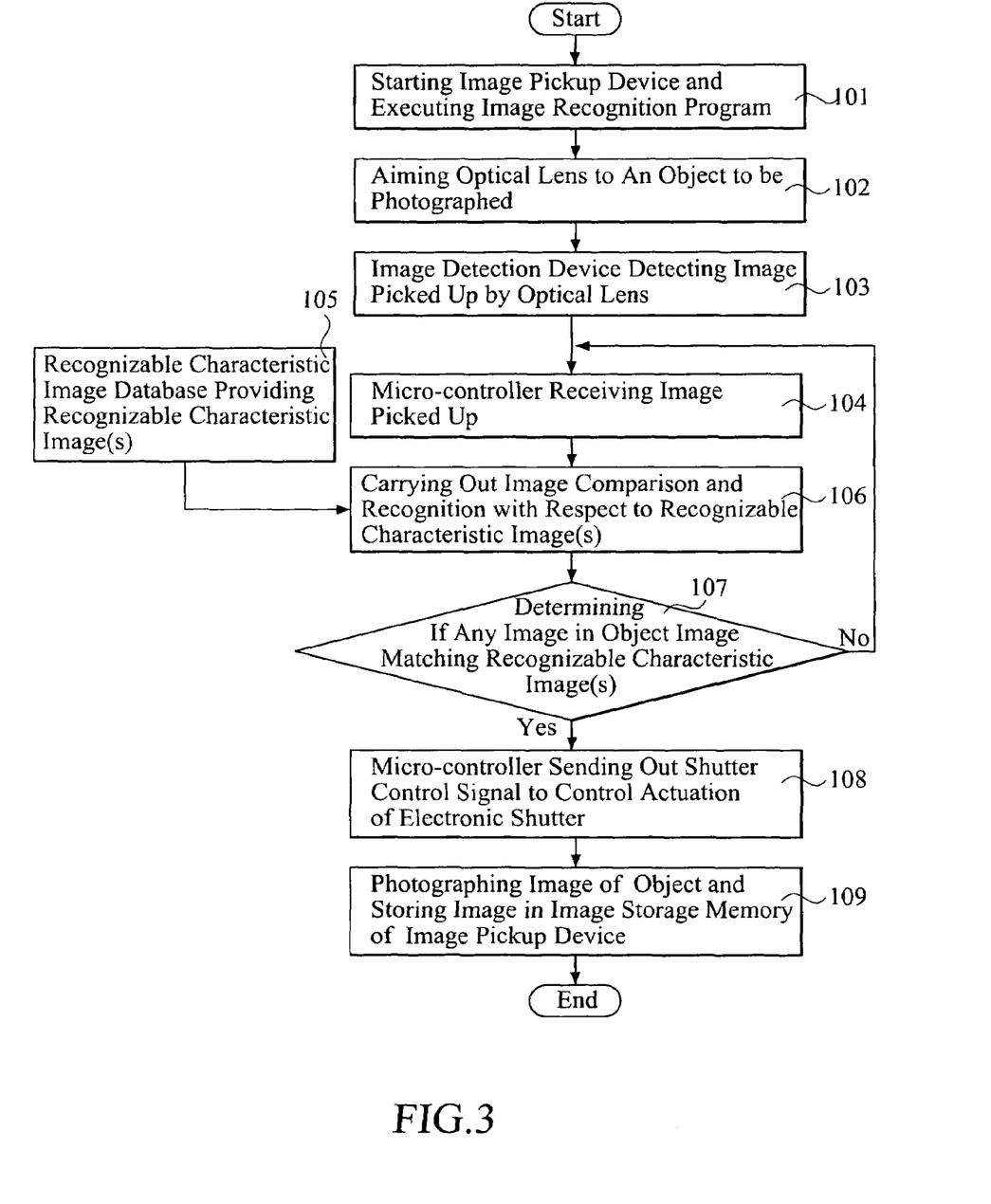
FIG. 3 is a flow chart illustrating a method for controlling an electronic shutter of the image pickup device based on recognizable characteristic image in accordance with the present invention.

Further referring to the flow chart illustrated in FIG. 3, at first, the image pickup device of the present invention starts and executes the image recognition program (step 101), and thereafter, a user aims the optical lens to an object to be photographed (step 102). At this time, the image detection device detects the image that is picked up by the optical lens (step 103) and the microcontroller receives the image so picked up (step 104).

When the micro-controller receives the image of the object so picked up, the recognizable characteristic image database provides the recognizable characteristic image(s) (step 105) and image comparison and recognition with respect to the recognizable characteristic image(s) is carried out (step 106) to determine if there is any image contained in the image of the object so picked up matching the recognizable characteristic image(s) (step 107). If an image contained in the image of the object so picked up is identified to match the recognizable characteristic image(s), the microcontroller sends out a shutter control signal to control the actuation of the electronic shutter (step 108) for photographing the image of the object and storing the image in the image storage memory of the image pickup device (step 109).

Figure 4:
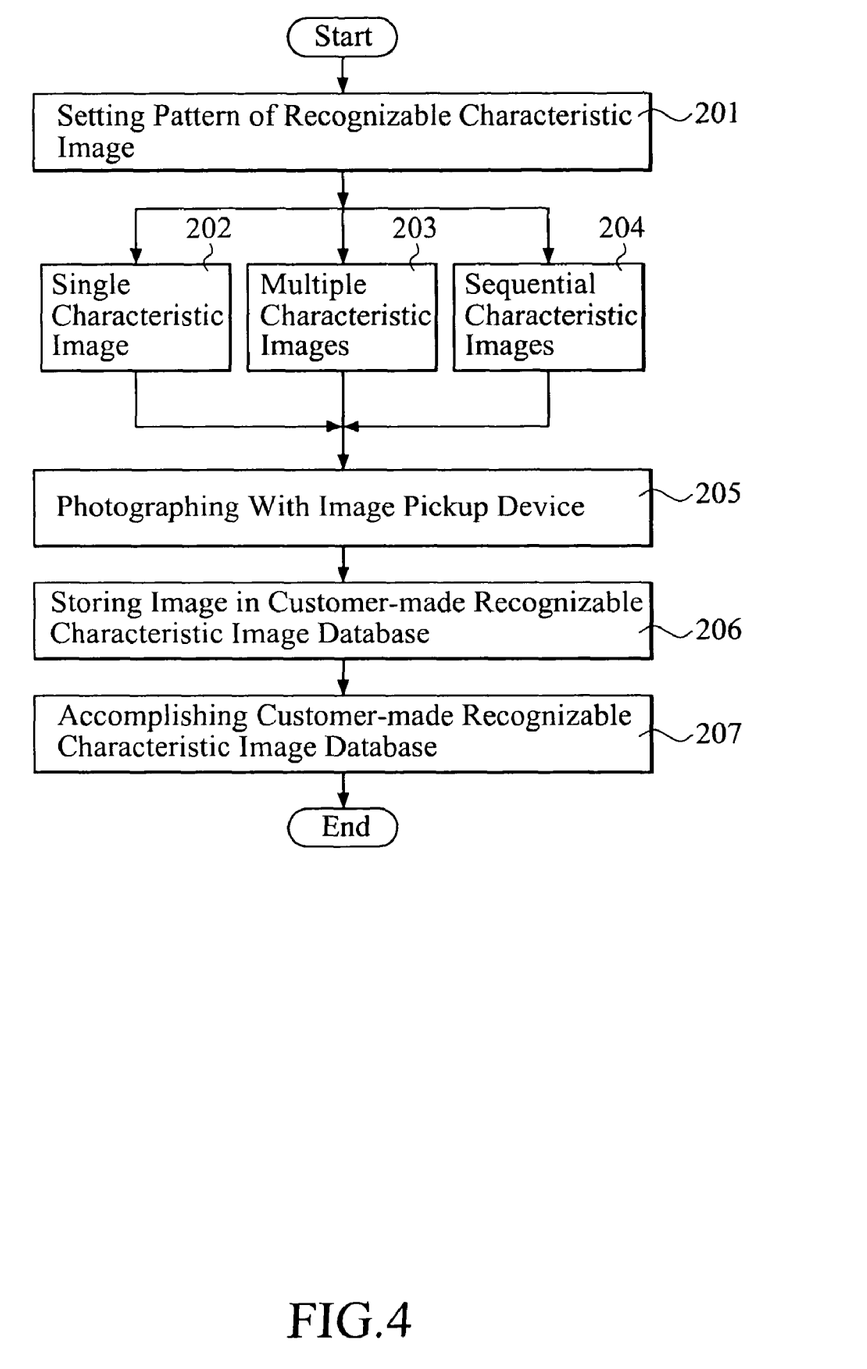
FIG. 4 is a flow chart that a user defines a customer-made recognizable characteristic image database.
Figure 5A:
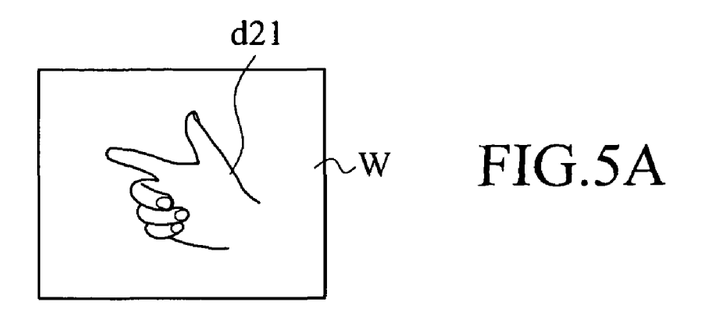
FIG. 5A illustrating an example of a single-image recognizable characteristic image.
Figure 5B:
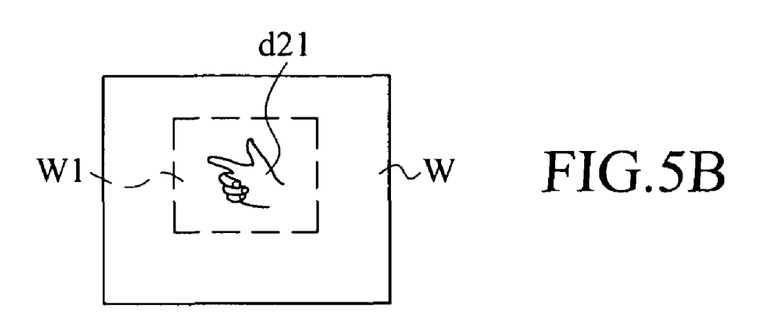
FIG. 5B showing a restricted recognition area.

FIG. 4 illustrates a flow chart that a user defines recognizable characteristic image(s) of the recognizable characteristic image database by himself or herself. In user-defining recognizable characteristic image(s), the user is allowed to set the pattern of recognizable characteristic image (step 201), which can be a single characteristic image (step 202), wherein the micro-controller, once identifying that an image that is contained in an image of object picked up by the image pickup device matches the single characteristic image of the recognizable characteristic image, sends out the shutter control signal to control the actuation of the electronic shutter. For example, FIG. 5A shows a finger gesture d21, which is a single-image recognizable characteristic image. If desired, the user may impose a restriction to confine the finger gesture within a preset zone inside the whole area of the viewfinder, as shown in FIG. 5B.

Figure 5C:
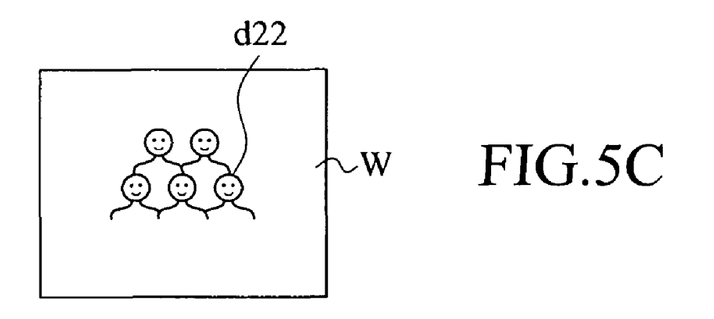
FIG. 5C illustrating an example of a multiple-imaged recognizable characteristic image.

The user may also define the pattern of the characteristic image to be multiple characteristic images (step 203), wherein the micro-controller sends out the shutter control signal only when the microcontroller identifies images contained in the image of object so picked up matching the multiple-imaged recognizable characteristic image. FIG. 5C demonstrates an example of the multiple-imaged recognizable characteristic image d22.

Figure 5D:
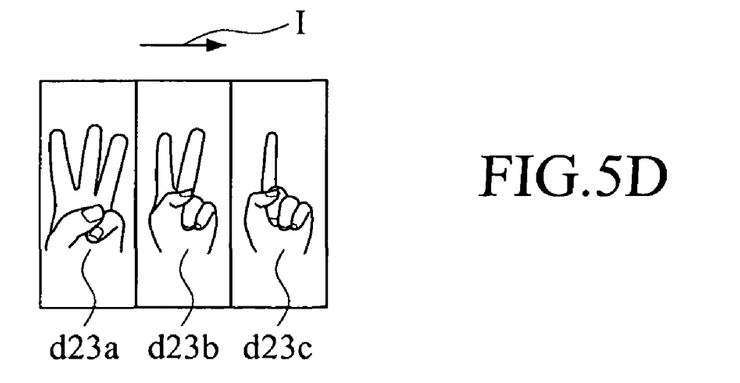
FIG. 5D illustrating an example of sequentially-imaged recognizable characteristic image.

The user may also define the pattern of the recognizable characteristic image to be sequential characteristic images (step 204), wherein the micro-controller sends out the shutter control signal only when the micro-controller identifies, in sequence, images contained in the images of object that are sequentially picked up matching the sequentially-imaged recognizable characteristic images. FIG. 5D demonstrates an example of the sequentially-imaged recognizable characteristic images d23a, d23b, d23c in a sequence along a direction I.

Once the pattern of the characteristic image is selected, photographing is carried out with the image pickup device (step 205) and the image of a pre-designated object stored in the customer-made recognizable characteristic image database (step 206). The customer-made recognizable characteristic image database is accomplished in step 207.

Figure 6:
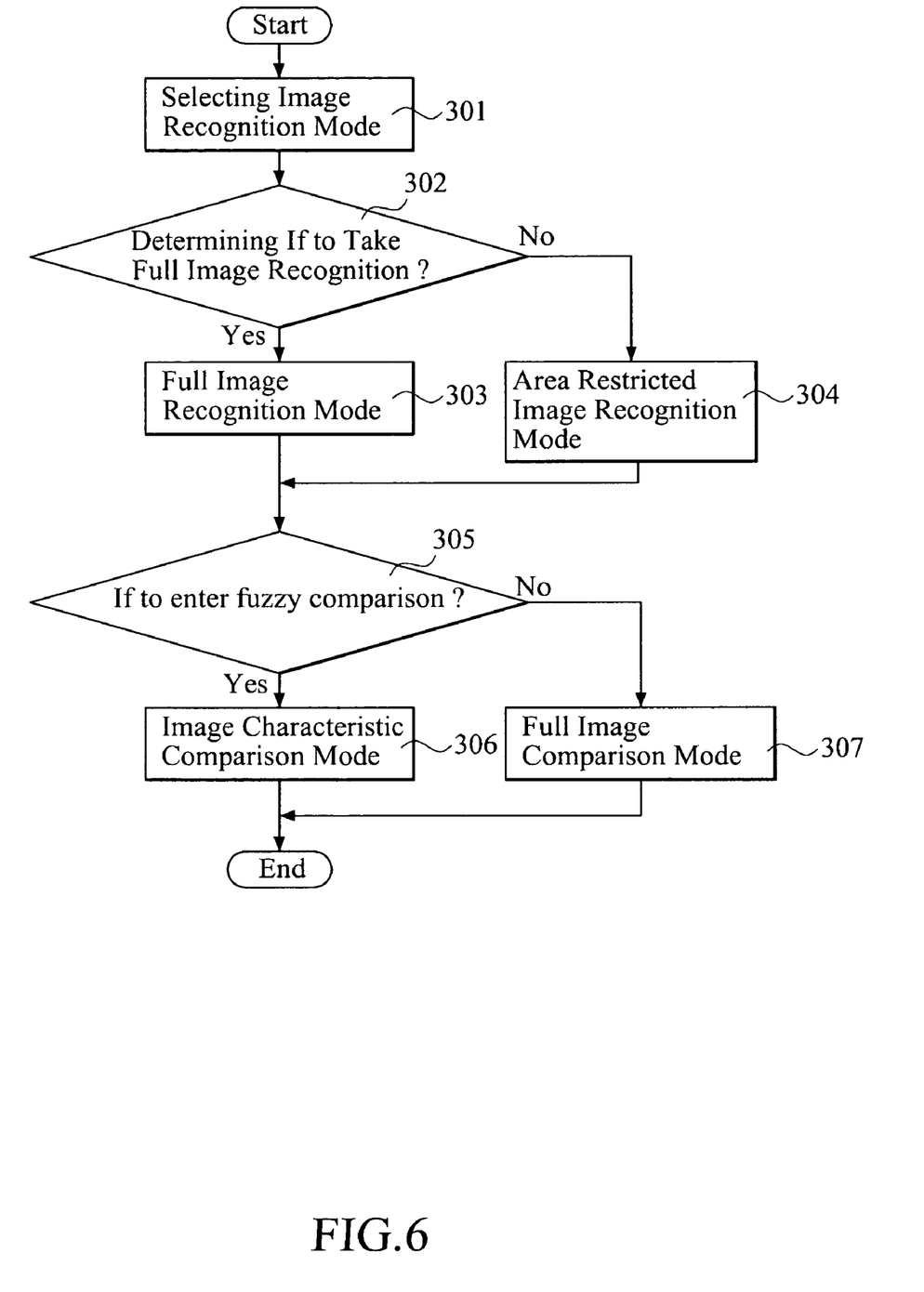
FIG. 6 illustrates a flow chart of a user selecting image recognition mode for image comparison and recognition in accordance with the present invention.

FIG. 6 illustrates a flow chart of a user selecting image recognition mode. In the operation flow illustrated in FIG. 3, in the image comparison and recognition step (namely step 106), the user can further select the image recognition mode. As shown in FIG. 6, in step 301, the user selects the image recognition mode (step 301), wherein the user first determines if to take full image recognition (step 302); if yes, then a full image recognition mode is entered (step 303), and if no, then an area restricted image recognition mode (step 304). No matter the user selects to enter the full image recognition mode (step 303) or to enter the restricted image recognition mode (step 304), the user may further select if to enter fuzzy comparison (step 305); if yes, then image characteristic comparison mode is entered (step 306), otherwise full image comparison mode is entered (step 307).

Although the present invention has been described with reference to the preferred embodiment thereof, as well as the best mode for carrying out the present invention, it is apparent to those skilled in the art that a variety of modifications and changes may be made without departing from the scope of the present invention which is intended to be defined by the appended claims.

What is claimed is:

1. An image pickup device, comprising: an optical lens;
   an electronic shutter, which functions as a control gate for the optical lens to control image picking of the optical lens;
   an image detection device, which detects an image picked up by the optical lens through the electronic shutter to convert the image to generate image data;
   a micro-controller, which is connected to the image detection device to receive the image data generated by the image detection device;
   an image storage memory, which is connected to the micro-controller for storing the image data;
   a recognizable characteristic image database, which is connected to the micro-controller and contains at least one recognizable characteristic image, wherein the recognizable characteristic image is a gesture; and
   a shutter control circuit, which is connected to the micro-controller and the electronic shutter and is operable to control the electronic shutter based on a shutter control signal generated by the micro-controller;
   wherein the micro-controller is configured to compare an image of a selected object that is picked up by the optical lens with the recognizable characteristic image contained in the recognizable characteristic image database, identify when an image contained in the image of the object so picked up matches the recognizable characteristic image, and if so, send out the shutter control signal to control the electronic shutter through the shutter control circuit to have the image of the object photographed and stored in the image storage memory.

2. The image pickup device as claimed in claim 1, wherein the image detection device comprises a charge-coupling device.

3. The image pickup device as claimed in claim 1, wherein the recognizable characteristic image database comprises a basic recognizable characteristic image database that contains at least one preset basic recognizable characteristic image.

4. The image pickup device as claimed in claim 1, wherein the recognizable characteristic image database comprises a customer-made recognizable characteristic image database that contains at least one customer-made recognizable characteristic image that is a gesture defined by a user.

5. The image pickup device as claimed in claim 1, wherein the recognizable characteristic image is a finger gesture.

6. The image pickup device as claimed in claim 1, wherein the recognizable characteristic image is a smile.

7. The image pickup device as claimed in claim 1, wherein the recognizable characteristic image is a sequence of characteristic images, and the microcontroller is configured to send out the shutter control signal only when the image of the selected object picked up by the optical lens matches, in sequence, the sequence of characteristic images.

8. A method for controlling a shutter of an image pickup device, wherein the image pickup device is used to pick up an image of an object to be photographed that contains a pre-designated recognizable characteristic image, the image pickup device comprising a micro-controller, an image storage memory, and a recognizable characteristic image database connected to the micro-controller, the recognizable characteristic image database containing at least one recognizable characteristic image, wherein the recognizable characteristic image is a gesture, the method comprising the following steps:
   (a) aiming an optical lens of the image pickup device to the object to be photographed;
   (b) picking up an image of the object;
   (c) comparing the image of the object so picked up with respect to the recognizable characteristic image contained in the recognizable characteristic image database;
   (d) the micro-controller sending out a shutter control signal to control the electronic shutter when an image contained in the image of the object so picked up is identified to match the recognizable characteristic image; and
   (e) photographing the image of the object and storing the image of the object in the image storage memory of the image pickup device.

9. The method as claimed in claim 8, wherein the recognizable characteristic image database of step (c) selectively comprises one of a single-image recognizable characteristic image, a multiple-image recognizable characteristic image, and a sequential-image recognizable characteristic image.

10. The method as claimed in claim 8 further comprising, after step (c), a step of selecting image recognition mode to select between full image recognition and area restricted image recognition.

11. The method as claimed in claim 8, wherein the recognizable characteristic image is a finger gesture.

12. The method as claimed in claim 8, wherein the recognizable characteristic image is a smile.

13. The method as claimed in claim 8, wherein the recognizable characteristic image is a sequence of characteristic images, and the microcontroller sends out the shutter control signal only when the image of the object picked up by the optical lens matches, in sequence, the sequence of characteristic images.

14. The method as claimed in claim 8, wherein the recognizable characteristic image database comprises a customer-made recognizable characteristic image database, further comprising the step of a user storing at least one customer-made recognizable characteristic image that is a gesture defined by a user in said customer-made recognizable characteristic image database.

* * * * *